(12) United States Patent
Shibata et al.

(10) Patent No.: US 11,214,303 B2
(45) Date of Patent: Jan. 4, 2022

(54) CONTROL DEVICE FOR VEHICLE

(71) Applicant: TOYOTA JIDOSHA KABUSHIKI KAISHA, Toyota (JP)

(72) Inventors: Kenji Shibata, Nagoya (JP); Koichi Itoh, Toyota (JP); Takafumi Sato, Obu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 187 days.

(21) Appl. No.: 16/593,183

(22) Filed: Oct. 4, 2019

(65) Prior Publication Data

US 2020/0164916 A1 May 28, 2020

(30) Foreign Application Priority Data

Nov. 26, 2018 (JP) .............................. JP2018-220525

(51) Int. Cl.
*B62D 6/00* (2006.01)
*B62D 5/00* (2006.01)

(52) U.S. Cl.
CPC .............. *B62D 6/008* (2013.01); *B62D 5/005* (2013.01)

(58) Field of Classification Search
CPC . B62D 5/00; B62D 5/04; B62D 5/046; B62D 5/005; B62D 5/0463; B62D 6/00; B62D 6/008
See application file for complete search history.

(56) References Cited

U.S. PATENT DOCUMENTS

| 2008/0185213 A1* | 8/2008 | Mori | B62D 5/006 180/402 |
| 2009/0024281 A1* | 1/2009 | Hwang | B62D 6/008 701/42 |
| 2014/0343791 A1* | 11/2014 | Suzuki | B62D 5/0487 701/41 |

FOREIGN PATENT DOCUMENTS

JP 2007-302082 A 11/2007

* cited by examiner

*Primary Examiner* — Tan Q Nguyen
(74) *Attorney, Agent, or Firm* — Sughrue Mion, PLLC

(57) ABSTRACT

A vehicle of a steer-by-wire type includes: a turning device that turns a wheel by actuating a turning motor; and a reaction torque generation device that applies a reaction torque to a steering wheel by actuating a reaction motor. A control device for the vehicle is configured to control turning of the wheel by controlling the turning motor and to control the reaction torque by controlling the reaction motor, according to rotation of the steering wheel. When a power output limiting condition is satisfied, the control device executes not only power output limiting processing that limits a power output of the turning motor but also reaction torque increasing processing. In the reaction torque increasing processing, the control device controls the reaction torque to make the steering wheel harder to rotate as compared with a case where the power output limiting processing is not executed.

9 Claims, 12 Drawing Sheets

CONTROL DEVICE FOR VEHICLE

BACKGROUND

Technical Field

The present disclosure relates to a control device for a vehicle of a steer-by-wire type.

Background Art

Patent Literature 1 discloses a method of controlling a steering reaction motor in a vehicle of a steer-by-wire type. The steering reaction motor applies a reaction torque to a steering wheel to give a driver a steering feeling.

LIST OF RELATED ART

Patent Literature 1: Japanese Unexamined Patent Application Publication No. JP-2007-302082

SUMMARY

A vehicle of a steer-by-wire type includes a turning device that turns (i.e. changes a direction) a wheel by actuating a turning motor. Here, let us consider a situation where a power output of the turning motor is limited. For example, it is conceivable to limit the power output of the turning motor for overheat protection of the turning motor. When the power output of the turning motor is limited, the wheel is not necessarily turned as intended by a driver. Meanwhile, a steering wheel is mechanically separated from the wheel, and thus the driver can continue to steer (rotate) the steering wheel while the power output of the turning motor is limited. As a result, discrepancy between the steering wheel rotation and the wheel turning may occur.

An object of the present disclosure is to provide a technique that can suppress the discrepancy between the steering wheel rotation and the wheel turning when the power output of the turning motor is limited in the vehicle of the steer-by-wire type.

A first aspect of the present disclosure is directed to a control device for a vehicle of a steer-by-wire type.

The vehicle includes:

a turning device configured to turn a wheel by actuating a turning motor; and a reaction torque generation device configured to apply a reaction torque to a steering wheel by actuating a reaction motor.

The control device is configured to control turning of the wheel by controlling the turning motor and to control the reaction torque by controlling the reaction motor, according to rotation of the steering wheel.

When a power output limiting condition is satisfied, the control device executes not only power output limiting processing that limits a power output of the turning motor but also reaction torque increasing processing.

In the reaction torque increasing processing, the control device controls the reaction torque to make the steering wheel harder to rotate as compared with a case where the power output limiting processing is not executed.

A second aspect further has the following feature in addition to the first aspect.

In the power output limiting processing, the control device limits the power output of the turning motor by decreasing a current limit value being an upper limit of a motor current driving the turning motor.

A third aspect further has the following feature in addition to the second aspect.

In the power output limiting processing, the control device decreases the current limit value such that the turning of the wheel stops.

In the reaction torque increasing processing, the control device makes the reaction torque in a case where the motor current is equal to or higher than the current limit value higher than the reaction torque in a case where the motor current is lower than the current limit value.

A fourth aspect further has the following feature in addition to the third aspect.

A precursor start value is a current value lower than the current limit value by a first value.

In the reaction torque increasing processing, the control device makes the reaction torque in a case where the motor current is equal to or higher than the precursor start value higher than the reaction torque in a case where the motor current is lower than the precursor start value.

A fifth aspect further has the following feature in addition to the fourth aspect.

In the reaction torque increasing processing, the control device gradually increases the reaction torque as the motor current increases from the precursor start value to the current limit value.

A sixth aspect further has the following feature in addition to any of the third to fifth aspects.

The power output limiting condition includes that a temperature of the turning motor exceeds a temperature threshold or a voltage supplied to the turning motor falls below a voltage threshold.

A seventh aspect further has the following feature in addition to the second aspect.

In the power output limiting processing, the control device decreases the current limit value as a steering speed of the steering wheel becomes higher.

A damping component of the reaction torque increases as the steering speed of the steering wheel becomes higher.

In the reaction torque increasing processing, the control device makes the damping component higher than in a case where the reaction torque increasing processing is not executed.

An eighth aspect further has the following feature in addition to the seventh aspect.

A precursor start value is a current value lower than the current limit value by a second value.

In the reaction torque increasing processing, the control device makes the damping component in a case where the motor current is equal to or higher than the precursor start value higher than the damping component in a case where the motor current is lower than the precursor start value.

A ninth aspect further has the following feature in addition to the seventh or eighth aspect.

The power output limiting condition includes that electric power of the turning motor exceeds a power threshold.

According to the present disclosure, the control device executes the reaction torque increasing processing together with the power output limiting processing that limits the power output of the turning motor. In the reaction torque increasing processing, the control device controls the reaction torque to make the steering wheel harder to rotate as compared with a case where the power output limiting processing is not executed. As a result, the discrepancy between the steering wheel rotation and the wheel turning is suppressed.

EMBODIMENTS

Embodiments of the present disclosure will be described below with reference to the attached drawings.

1. Steer-by-Wire System

Figure 1:
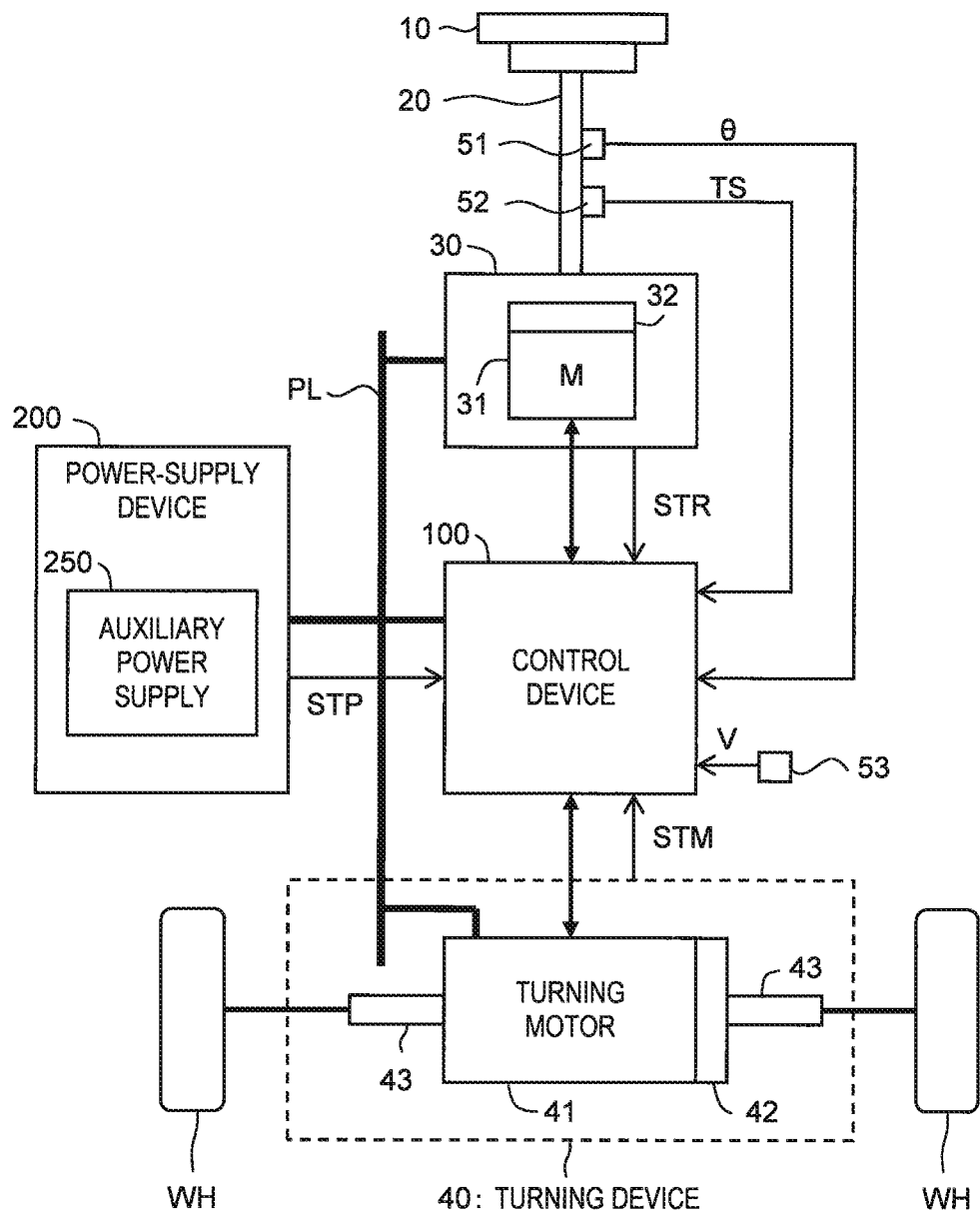
FIG. 1 is a block diagram schematically showing a configuration example of a steer-by-wire system according to an embodiment of the present disclosure.

FIG. 1 is a block diagram schematically showing a configuration example of a steer-by-wire system 1 according to the present embodiment. The steer-by-wire system 1 is installed on a vehicle and turns (i.e. changes a direction of) a wheel WH of the vehicle by a steer-by-wire manner. That is, the steer-by-wire system 1 achieves the vehicle of a steer-by-wire type.

In the example shown in FIG. 1, the steer-by-wire system 1 includes a steering wheel 10, a steering shaft 20, a reaction torque generation device 30, a turning device 40, a sensor group (51 to 53), a control device (controller) 100, and a power supply device 200.

The steering wheel 10 is an operation member that a driver of the vehicle uses for steering. The steering shaft 20 is coupled with the steering wheel 10 and rotates together with the steering wheel 10.

The reaction torque generation device 30 applies a reaction torque TR to the steering wheel 10 in a pseudo manner. More specifically, the reaction torque generation device 30 includes a reaction motor 31 (reaction actuator). A rotor of the reaction motor 31 is connected to the steering shaft 20 through a speed reducer 32. Actuating the reaction motor 31 makes it possible to apply the reaction torque TR to the steering shaft 20 and thus to the steering wheel 10. An operation of the reaction torque generation device 30 is controlled by the control device 100.

The reaction torque generation device 30 sends reaction motor state information STR indicating a state of the reaction motor 31 to the control device 100. For example, the reaction motor state information STR indicates a driving voltage, a driving current, an angle of rotation, a speed of rotation, a temperature, and the like of the reaction motor 31.

The turning device 40 turns the wheel WH. Here, turning the wheel WH means changing a direction of the wheel WH for making a turn. More specifically, the turning device 40 includes a turning motor 41, a speed reducer 42, and a turning bar 43. A rotor or the turning motor 41 is connected to the turning bar 43 through the speed reducer 42. The turning bar 43 is coupled with the wheel WH. When the turning motor 41 rotates, its rotational motion is converted into a linear motion of the turning bar 43, and thereby the wheel WH turns (i.e. changes its direction). That is, actuating the turning motor 41 makes it possible to turn the wheel WH. An operation of the turning motor 41 is controlled by the control device 100.

The turning device 40 sends turning motor state information STM indicating a state of the turning motor 41 to the control device 100. For example, the turning motor state information STM indicates a driving voltage, a driving current (a motor current Im), an angle of rotation, a speed of rotation, a temperature, and the like of the turning motor 41.

It should be noted that the turning device 40 is mechanically separated from the steering wheel 10 and the reaction torque generation device 30 on the steering side.

A steering angle sensor 51 detects a steering angle θ of the steering wheel 10. The steering angle sensor 51 sends information of the detected steering angle θ to the control device 100.

A steering torque sensor 52 detects a steering torque TS applied to the steering shaft 20. The steering torque sensor 52 sends information of the detected steering torque TS to the control device 100.

A vehicle speed sensor 53 detects a vehicle speed V being a speed of the vehicle. The vehicle speed sensor 53 sends information of the detected vehicle speed V to the control device 100. It should be noted that a wheel speed sensor may be used instead of the vehicle speed sensor 53 to calculate the vehicle speed V from a speed of of rotation of each wheel.

The control device 100 (i.e. the controller) controls the steer-by-wire system 1 according to the present embodiment. The control device 100 includes a microcomputer provided with a processor, a memory, and an input/output interface. The microcomputer is also called an ECU (Electronic Control Unit). Processing by the control device 100 is achieved by the processor executing a control program stored in the memory.

For example, the control device 100 controls turning of the wheel WH by controlling the operation of the turning motor 41 according to rotation (steering) of the steering wheel 10. For example, the control device 100 calculates a target turn angle based on the steering angle θ, the vehicle speed V, and so forth. Then, control device 100 controls the turning motor 41 such that a turn angle of the wheel WH becomes the target turn angle. More specifically, the control device 100 generates a current control signal for driving the turning motor 41, based on the angle of rotation of the turning motor 41 and the target turn angle. The turning motor 41 is driven according to the current control signal, and the wheel WH is turned by the rotation of the turning motor 41.

Moreover, the control device 100 controls the reaction torque TR applied to the steering wheel 10 by controlling the operation of the reaction motor 31 according to rotation (steering) of the steering wheel 10. For example, the control device 100 calculates a target reaction torque based on the steering angle θ, the vehicle speed V, and so forth. Then, the control device 100 controls the reaction motor 31 such that the target reaction torque is generated. More specifically, the control device 100 generates a current control signal for driving the reaction motor 31, based on the target reaction torque, the angle of rotation of the reaction motor 31, the steering torque TS, and so forth. The reaction motor 31 is driven according to the current control signal, and thereby the reaction torque TR is generated.

It should be noted that the control device 100 may separately include a first control device for controlling the turning motor 41 and a second control device for controlling the reaction motor 31. In that case, the first control device and the second control device are communicably connected to each other and exchange necessary information with each other.

The power supply device 200 supplies electric power to each component of the steer-by-wire system 1, such as the reaction motor 31, the turning motor 41, and the control device 100. The power supply device 200 is connected to each component via a power supply line PL, and supplies electric power to each component via the power supply line PL.

The power supply device 200 may include an auxiliary power supply 250. If an abnormality occurs in the power supply device 200, the electric power may be supplied from the auxiliary power supply 250. For example, the power supply device 200 includes a generator (alternator), an auxiliary battery, and a backup power supply (electric storage device). If the generator fails, the electric power is supplied from the auxiliary battery or the backup power supply. In that case, the auxiliary battery or the backup power supply functions as the auxiliary power supply 250.

The power supply device 200 sends power supply state information STP indicating a state of the power supply device 200 to the control device 100. The power supply state information STP includes an operation state and an output voltage of the power supply device 200, an operation state, an output voltage, and a remaining power of the auxiliary power supply 250, and the like.

2. Power Output Limiting Processing

The control device 100 according to the present embodiment executes "power output limiting processing" that limits a power output of the turning motor 41, as necessary. Various examples can be considered as a purpose of the power output limiting processing. The output limiting processing is roughly classified into "first output limiting processing" and "second output limiting processing" described below.

2-1. First Power Output limiting Processing

The first power output limiting processing is the power output limiting processing for eventually stopping the turning of the wheel WH. For example, when a temperature of the turning motor 41 excessively rises, the first power output limiting processing is executed for overheat protection. As another example, when a voltage (a driving voltage) supplied from the power supply device 200 to the turning motor 41 drops abnormally, the first power output limiting processing is executed for protecting the turning motor 41.

For example, a current limit value I_lim is used for limiting the power output of the turning motor 41. The current limit value I_lim is an upper limit of a motor current Im driving the turning motor 41. Normally, the current limit value I_lim is set to a default value. When the first power output limiting processing is executed, the control device 100 decreases the current limit value I_lim from the default value. As a result, the power output (i.e. an output torque) of the turning motor 41 is limited. The current limit value I_lim related to the first power output limiting processing is hereinafter referred to as a "first current limit value I_lim1".

Figure 2:
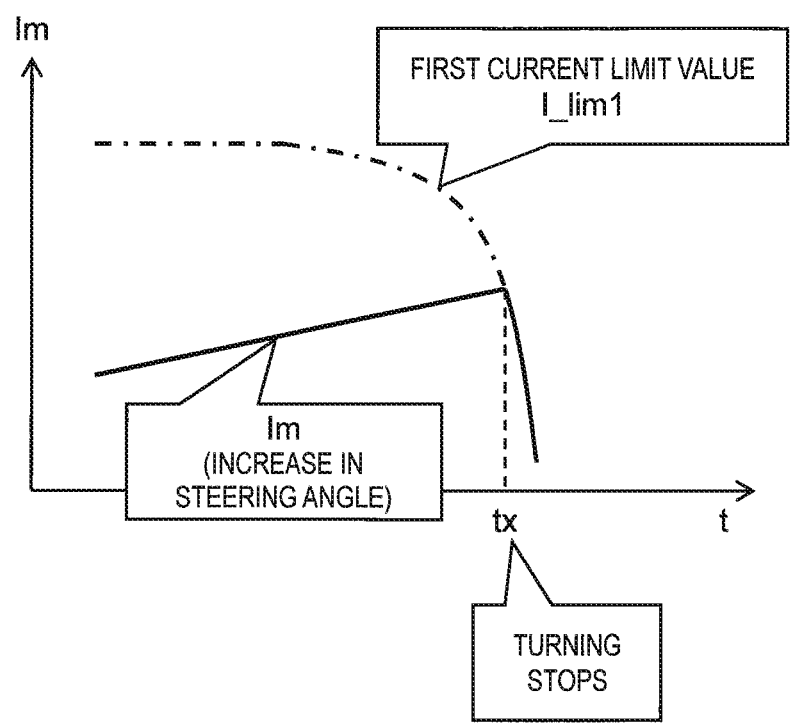
FIG. 2 is a conceptual diagram for explaining an example of first power output limiting processing according to the embodiment of the present disclosure.

FIG. 2 is a conceptual diagram for explaining an example of the first power output limiting processing. A horizontal axis represents time, and a vertical axis represents the motor current Im. The control device 100 decreases the first current limit value I_lim1 so that the turning of the wheel WH stops. In the example shown in FIG. 2, the first current limit value I_lim1 gradually decreases and a rate of the decrease increases with time. Meanwhile, when the steering angle θ of the steering wheel 10 increases, the motor current Im gradually increases. The motor current Im becomes equal to the first current limit value I_lim1 at a time tx, and then rapidly decreases together with the first current limit value I_lim1. In the vicinity of the time tx, the turning of the wheel WH stops.

2-2. Second Power Output Limiting Processing

The second power output limiting processing is the power output limiting processing by which the wheel WH becomes hard to turn but the turning of the wheel WH is not stopped. For example, when power consumption of the turning motor 41 is excessive, the second power output limiting processing is executed for power limitation. As another example, when an abnormality occurs in the power supply device 200 and the electric power is supplied from the auxiliary power supply 250 to the turning motor 41, the second power output limiting processing is executed in order to increase a steer-by-wire turning-available duration.

As in the case of the first power output limiting processing described above, the control device 100 decreases the current limit value I_lim from the default value. As a result, the power output (i.e. the output torque) of the turning motor 41 is limited. The current limit value I_lim related to the second power output limiting processing is hereinafter referred to as a "second current limit value I_lim2".

Figure 3:
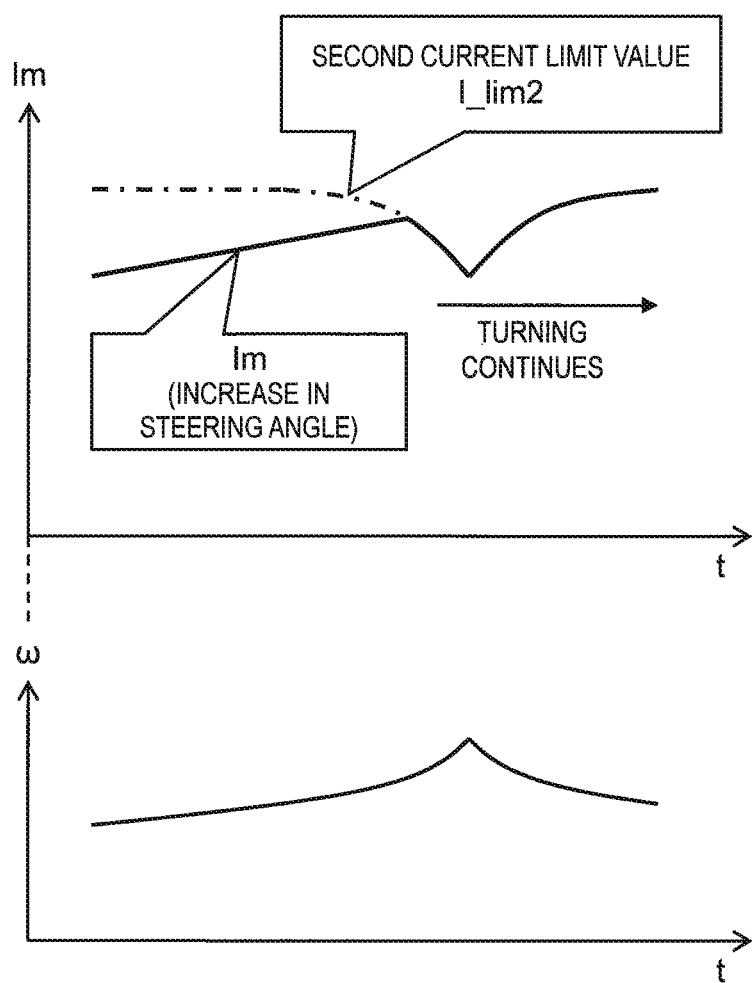
FIG. 3 is a conceptual diagram for explaining an example of second power output limiting processing according to the embodiment of the present disclosure.

FIG. 3 is a conceptual diagram for explaining an example of the second power output limiting processing. A horizontal axis represents time, and a vertical axis represents the motor current Im and a steering speed w of the steering wheel 10. As the steering speed w becomes higher, the motor current Im drawn from the power supply device 200 (or the auxiliary power supply 250) to the turning motor 41 increases and the power consumption of the turning motor 41 increases. In view of the above, the control device 100 decreases the second current limit value I_lim2 as the steering speed w becomes higher. Although following performance (i.e. responsiveness) of the turning of the wheel WH with respect to the steering of the steering wheel 10 tends to decrease, the turning of the wheel WH does not stop because the motor current Im flows to some extent.

3. Reaction Torque Increasing Processing

When the power output limiting processing is executed, the wheel WH is not necessarily turned as intended by the driver. Meanwhile, the steering wheel 10 is mechanically separated from the wheel WH, and thus the driver can continue to steer (rotate) the steering wheel 10 while the power output of the turning motor 41 is limited. As a result, discrepancy between rotation of the steering wheel 10 and the turning of the wheel WH may occur.

In view of the above, the control device 100 according to the present embodiment executes the following processing in order to suppress the discrepancy between the rotation of the steering wheel 10 and the turning of the wheel WH. That is, the control device 100 controls the reaction torque TR to make the steering wheel 10 harder to rotate as compared with a case where the power output limiting processing is not executed. In other words, the control device 100 not only limits the power output of the turning motor 41 but also limits the rotation of the steering wheel 10.

For example, in the case where the first power output limiting processing described above (see FIG. 2) is executed, the turning of the wheel WH stops in the vicinity of the time tx at which the motor current Im becomes equal to the first current limit value I_lim1. Therefore, the control device 100 increases the reaction torque TR in response to the increase in the motor current Im to the first current limit value I_lim1. As a result, the steering wheel 10 becomes harder to rotate, and thus the discrepancy between the rotation of the steering wheel 10 and the turning of the wheel WH is suppressed.

As another example, in the case where the second power output limiting processing described above (see FIG. 3) is executed, the second current limit value I_lim2 decreases as the steering speed w becomes higher. Therefore, the control device 100 increases a damping component of the reaction torque TR. The damping component is a component that increases as the steering speed w of the steering wheel 10 becomes higher. In synchronization with the decrease in the second current limit value I_lim2, the reaction torque TR is increased and thus the steering wheel 10 becomes harder to rotate. As a result, the discrepancy between the rotation of the steering wheel 10 and the turning of the wheel WH is suppressed.

Such the processing of controlling the reaction torque TR to make the steering wheel 10 harder to rotate is hereinafter referred to as "reaction torque increasing processing".

According to the steer-by-wire system 1 of the present embodiment, the control device 100 executes the reaction torque increasing processing together with the power output limiting processing that limits the power output of the turning motor 41. In the reaction torque increasing processing, the control device 100 controls the reaction torque TR to make the steering wheel 10 harder to rotate as compared with the case where the power output limiting processing is not executed. As a result, the discrepancy between the rotation of the steering wheel 10 and the turning of the wheel WH is suppressed.

4. Examples of Processing by Steer-by-Wire System

Figure 4:
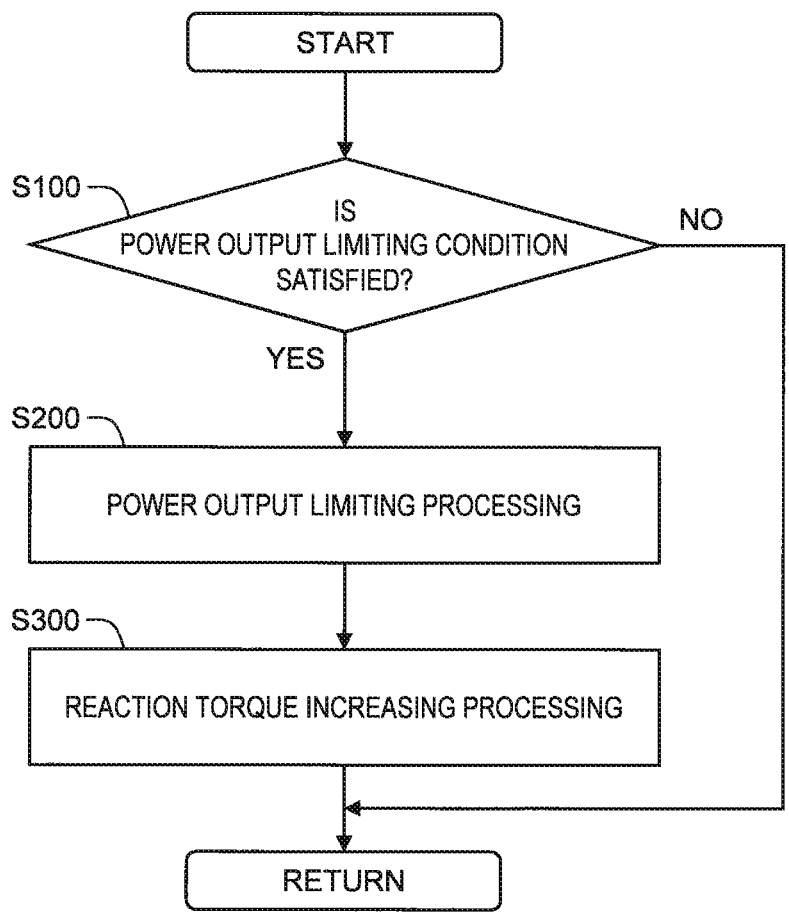
FIG. 4 is a flow chart showing an outline of processing by the steer-by-wire system according to the embodiment of the present disclosure.

FIG. 4 is a flow chart showing an outline of the processing by the steer-by-wire system 1 according to the present embodiment. The processing shown in FIG. 4 is repeatedly executed every predetermined cycle.

In Step S100, the control device 100 determines whether or not a "power output limiting condition" is satisfied. The power output limiting condition is a condition for executing the power output limiting processing. When the power output limiting condition is not satisfied (Step S100; No), the processing in the current cycle ends. On the other hand, when the power output limiting condition is satisfied (Step S100; Yes), the processing proceeds to Steps S200 and S300.

In Step S200, the control device 100 executes the power output limiting processing that limits the power output of the turning motor 41. For example, the control device 100 limits the power output of the turning motor 41 by decreasing the current limit value I_lim.

In Step S300, the control device 100 executes the reaction torque increasing processing. More specifically, the control device 100 controls the reaction torque TR to make the steering wheel 10 harder to rotate as compared with the case where the power output limiting processing is not executed. Due to the reaction torque increasing processing, the discrepancy between the rotation of the steering wheel 10 and the turning of the wheel WH is suppressed.

Hereinafter, a variety of concrete examples of the processing by the steer-by-wire system 1 according to the present embodiment will be described.

4-1. First Example

Figure 5:
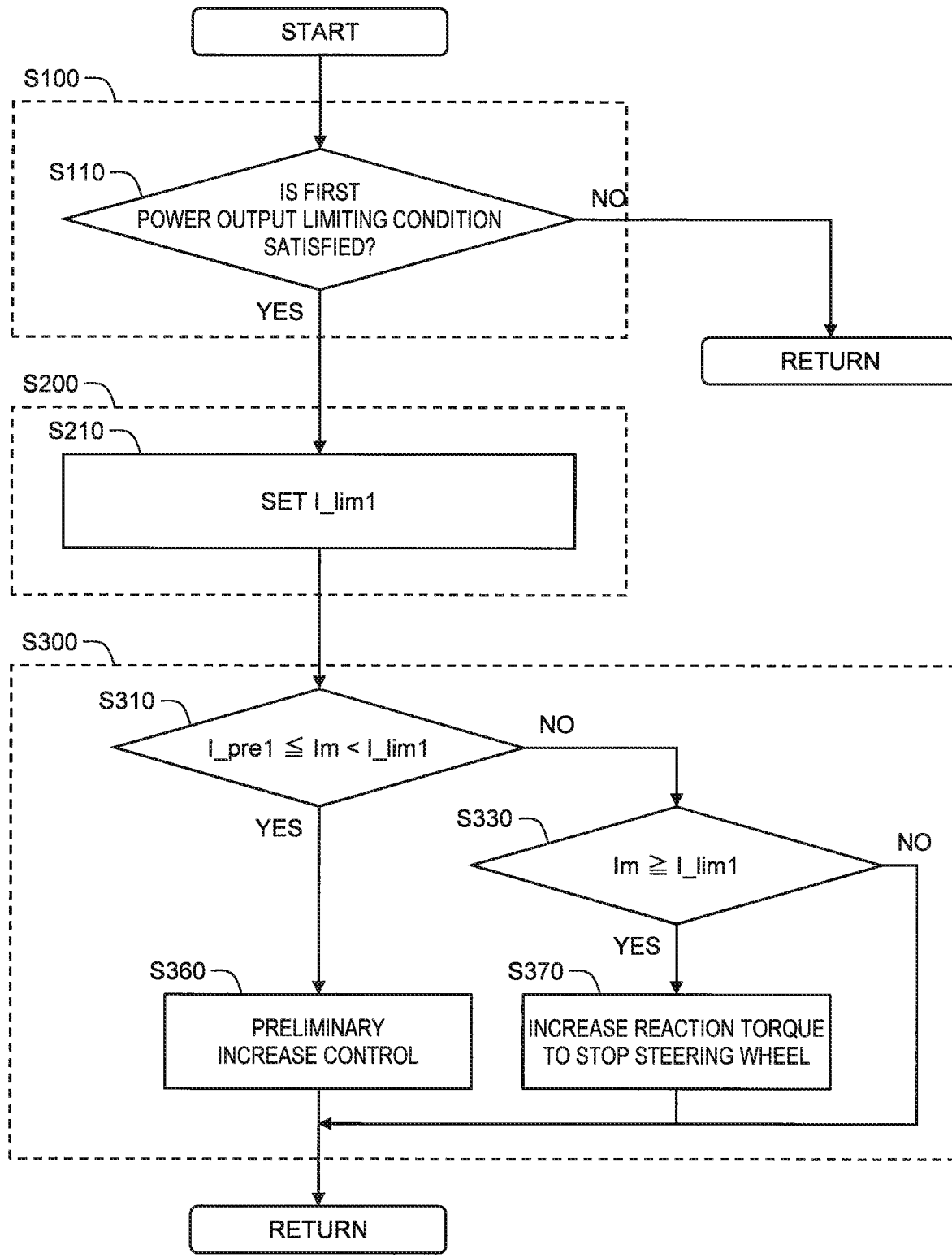
FIG. 5 is a flow chart showing a first example of the processing by the steer-by-wire system according to the embodiment of the present disclosure.

FIG. 5 is a flow chart showing a first example of the processing by the steer-by-wire system 1. The first example is associated with the first power output limiting processing (see FIG. 2).

Step S100 includes Step S110. In Step S110, the control device 100 determines whether or not a "first power output limiting condition" is satisfied. The first power output limiting condition is a condition for executing the first power output limiting processing.

An example of the first power output limiting condition is that "a temperature TE of the turning motor 41 exceeds a temperature threshold TEth". The temperature TE of the turning motor 41 can be acquired based on the turning motor state information STM indicating the state of the turning motor 41. For example, the temperature TE of the turning motor 41 is estimated from a history of the motor current Im flowing through the turning motor 41. As another example, when the turning device 40 includes a temperature sensor and the turning motor state information STM includes information on the temperature TE detected by the temperature sensor, the detected temperature TE may be used.

Another example of the first power output limiting condition is that "the voltage (driving voltage) supplied from the power supply device 200 to the turning motor 41 falls below a voltage threshold". The voltage supplied from the power supply device 200 to the turning motor 41 is acquired from the power supply state information STP indicating the state of the power supply device 200 or the turning motor state information STM indicating the state of the turning motor 41.

When the first power output limiting condition is not satisfied (Step S110; No), the processing in the current cycle ends. On the other hand, when the first power output limiting condition is satisfied (Step S110; Yes), the processing proceeds to Steps S200 and S300.

Step S200 includes Step S210. In Step S210, the control device 100 sets the first current limit value I_lim1 to execute the first power output limiting processing. More specifically, the control device 100 decreases the first current limit value I_lim1 such that the turning of the wheel WH eventually stops.

Figure 6:
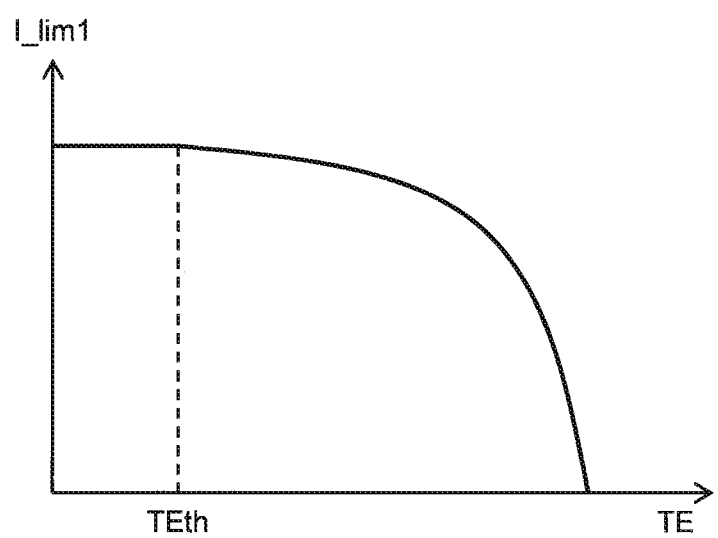
FIG. 6 is a conceptual diagram for explaining a setting example of a first current limit value in the first example of the processing by the steer-by-wire system according to the embodiment of the present disclosure.

FIG. 6 is a conceptual diagram for explaining a setting example of the first current limit value I_lim1. A horizontal axis represents the temperature TE of the turning motor 41, and a vertical axis represents the first current limit value I_lim1. When the temperature TE exceeds the temperature threshold TEth, the first current limit value I_lim1 decreases below the default value. As the temperature TE increases, the first current limit value I_lim1 further decreases. Therefore, if the temperature TE of the turning motor 41 continues to increase, the first current limit value I_lim1 greatly decreases, which results in stop of the turning of the wheel WH.

In Step S300, the control device 100 executes the reaction torque increasing processing based on a relationship between the motor current Im and the first current limit I_lim1. Here, the motor current Im is an actual current. Alternatively, the motor current Im may be a target value (required value) of the motor current Im calculated by the control device 100.

Figure 7:
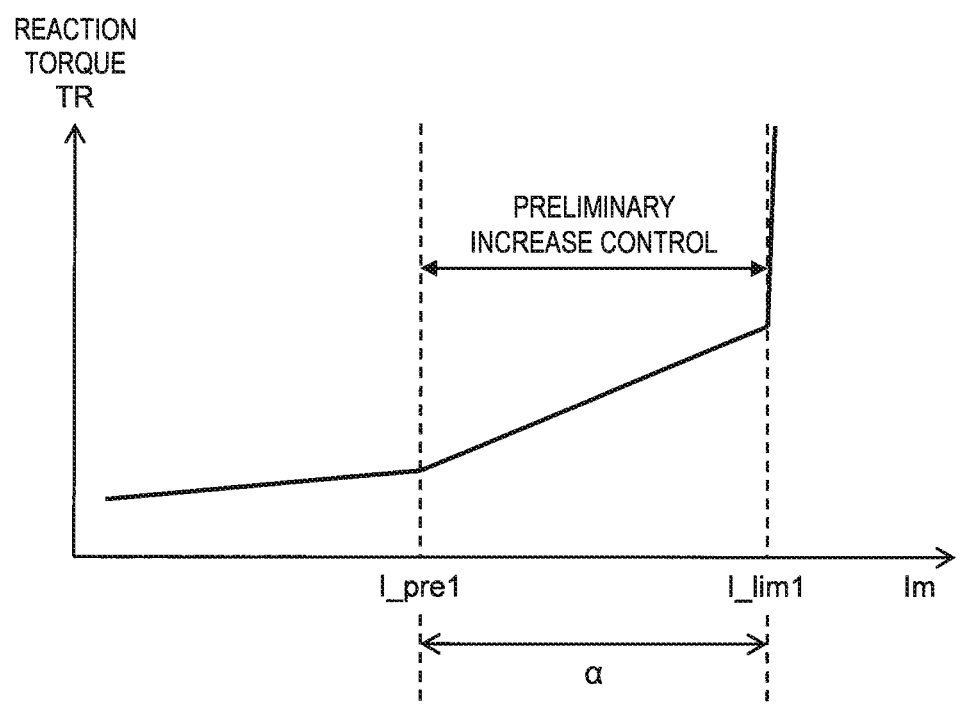
FIG. 7 is a conceptual diagram for explaining reaction torque increasing processing in the first example of the processing by the steer-by-wire system according to the embodiment of the present disclosure.

FIG. 7 is a conceptual diagram for explaining the reaction torque increasing processing according to the first example. A horizontal axis represents the motor current Im, and a vertical axis represents the reaction torque TR. In the vicinity of the time tx at which the motor current Im becomes equal to the first current limit value I_lim1, the turning of the wheel WH stops. Therefore, the control device 100 makes the reaction torque TR in a case where the motor current Im is equal to or higher than the first current limit value I_lim1 higher than the reaction torque TR in a case where the motor current Im is lower than the first current limit value I_lim1. As a result, the steering wheel 10 becomes harder to rotate. Preferably, the control device 100 increases the reaction torque TR such that the steering wheel 10 cannot be rotated.

If the turning of the wheel WH stops suddenly and the reaction torque TR increases suddenly at the time when the motor current Im reaches the first current limit value I_lim1, the driver may feel a sense of insecurity or strangeness. From this point of view, the control device 100 may increase the reaction torque TR before the motor current Im reaches the first current limit value I_lim1. Such the processing is hereinafter referred to as "preliminary increase control".

For example, a "first precursor start value I_pre1" as shown in FIG. 7 is set. The first precursor start value I_pre1 is a current value lower than the first current limit value I_lim1 by a first value α (i.e. I_pre1=I_lim1−α). The control device 100 makes the reaction torque TR in a case where the motor current Im is equal to or higher than the first precursor start value I_pre1 higher than the reaction torque TR in a case where the motor current Im is lower than the first precursor start value I_pre1. The first precursor start value I_pre1 (or the first value α) may have a hysteresis characteristic.

Such preliminary increase control enables the driver to know in advance the stop of the turning of the wheel WH and the rapid increase in the reaction torque TR before the turning of the wheel WH stops. As a result, the driver's feelings of insecurity and strangeness are reduced.

As shown in FIG. 7, the control device 100 may gradually increase the reaction torque TR as the motor current Im increases from the first precursor start value I_pre1 to the first current limit value I_lim1. As a result, the reaction torque TR changes more smoothly, and thus the driver's feeling of strangeness is further reduced.

Referring again to FIG. 5, Step S300 will be described. When the motor current Im is equal to or higher than the first precursor start value I_pre1 and lower than the first current limit value I_lim1 (Step S310; Yes), the processing proceeds to Step S360. In Step S360, the control device 100 executes the preliminary increment control. More specifically, the control device 100 makes the reaction torque TR in the case where the motor current Im is equal to or higher than the first precursor start value I_pre1 higher than the reaction torque TR in the case where the motor current Im is lower than the first precursor start value I_pre1.

When the motor current Im is equal to or higher than the first current limit value I_lim1 (Step S310; No, and Step S330; Yes), the processing proceeds to Step S370. The control device 100 makes the reaction torque TR in the case where the motor current Im is equal to or higher than the first current limit value I_lim1 higher than the reaction torque TR in the case where the motor current Im is lower than the first current limit value I_lim1. As a result, the steering wheel 10 becomes harder to rotate. Preferably, the control device 100 increases the reaction torque TR such that the steering wheel 10 cannot be rotated.

4-2. Second Example

Figure 8:
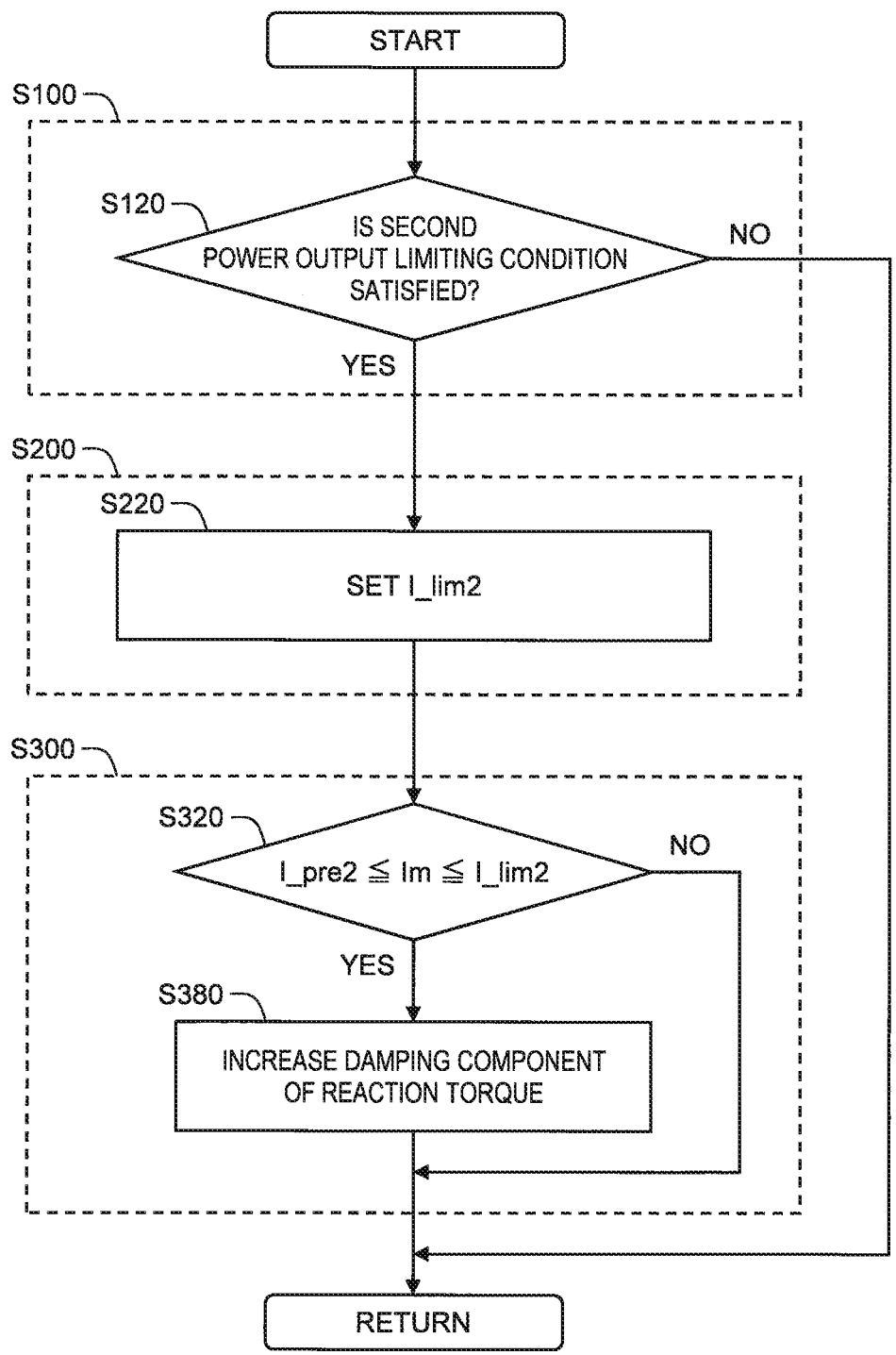
FIG. 8 is a flow chart showing a second example of the processing by the steer-by-wire system according to the embodiment of the present disclosure.

FIG. 8 is a flow chart showing a second example of the processing by the steer-by-wire system 1. The second example is associated with the second power output limiting processing (see FIG. 3).

Step S100 includes Step S120. In Step S120, the control device 100 determines whether or not a "second power output limiting condition" is satisfied. The second power output limiting condition is a condition for executing the second power output limiting processing.

An example of the second power output limiting condition is that "electric power of the turning motor 41 exceeds a power threshold". For example, the electric power (e.g. power consumption) of the turning motor 41 is calculated from the speed of rotation and the voltage of the turning motor 41. The speed of rotation and the voltage of the turning motor 41 are obtained from the turning motor state information STM indicating the state of the turning motor 41. It is also possible to use the steering speed ω of the steering wheel 10 or the speed of rotation of the reaction motor 31 instead of the speed of rotation of the turning motor 41. The steering speed ω of the steering wheel 10 is calculated from the steering angle θ. The speed of rotation of the reaction motor 31 is obtained from the reaction motor state information STR indicating the state of the reaction motor 31.

Another example of the second power output limiting condition is that "electric power is supplied from the auxiliary power supply 250 to the turning motor 41". Whether or not the electric power is supplied from the auxiliary power supply 250 to the turning motor 41 can be determined based on the power supply state information STP indicating the state of the power supply device 200.

When the second power output limiting condition is not satisfied (Step S120; No), the processing in the current cycle ends. On the other hand, when the second power output limiting condition is satisfied (Step S120; Yes), the processing proceeds to Steps S200 and S300.

Step S200 includes Step S220. In Step S220, the control device 100 sets the second current limit value I_lim2 to execute the second power output limiting processing. More specifically, the control device 100 decreases the second current limit value I_lim2 as the steering speed ω of the steering wheel 10 becomes higher.

Figure 9:
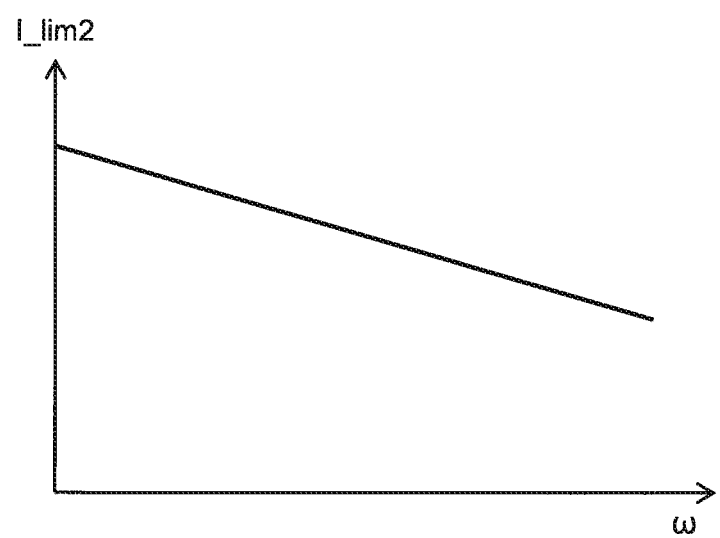
FIG. 9 is a conceptual diagram for explaining a setting example of a second current limit value in the second example of the processing by the steer-by-wire system according to the embodiment of the present disclosure.

FIG. 9 is a conceptual diagram for explaining a setting example of the second current limit value I_lim2. A horizontal axis represents the steering speed ω of the steering wheel 10, and a vertical axis represents the second current limit value I_lim2. The steering speed ω is calculated from the steering angle θ. As shown in FIG. 9, the second current limit value I_lim2 decreases as the steering speed ω increases. As a result, following performance (i.e. responsiveness) of the turning of the wheel WH with respect to the steering of the steering wheel 10 decreases.

In Step S300, the control device 100 increases the damping component of the reaction torque TR as compared with a case where the reaction torque increasing processing is not executed, in consideration of the decrease in the second current limit value I_lim2. The damping component is a component that increases as the steering speed ω of the steering wheel 10 becomes higher.

For instance, the control device 100 may set a "second precursor start value I_pre2" based on the second current limit value I_lim2. The second precursor start value I_pre2 is a current value lower than the second current limit value I_lim2 by a second value β (i.e. I_pre2=I_lim2−β). When the motor current Im is equal to or higher than the second precursor start value I_pre2 and equal to or lower than the second current limit value I_lim2 (Step S320; Yes), the processing proceeds to Step S380.

In Step S380, the control device 100 makes the damping component in the case where the motor current Im is equal to or higher than the second precursor start value I_pre2 higher than the damping component in a case where the motor current Im is lower than the second precursor start value I_pre2. As a result, the reaction torque TR is increased and thus the steering wheel 10 becomes harder to rotate. This enables the driver to know in advance that following performance (i.e. responsiveness) of the turning of the wheel WH may be lowered.

4-3. Third Example

Figure 10:
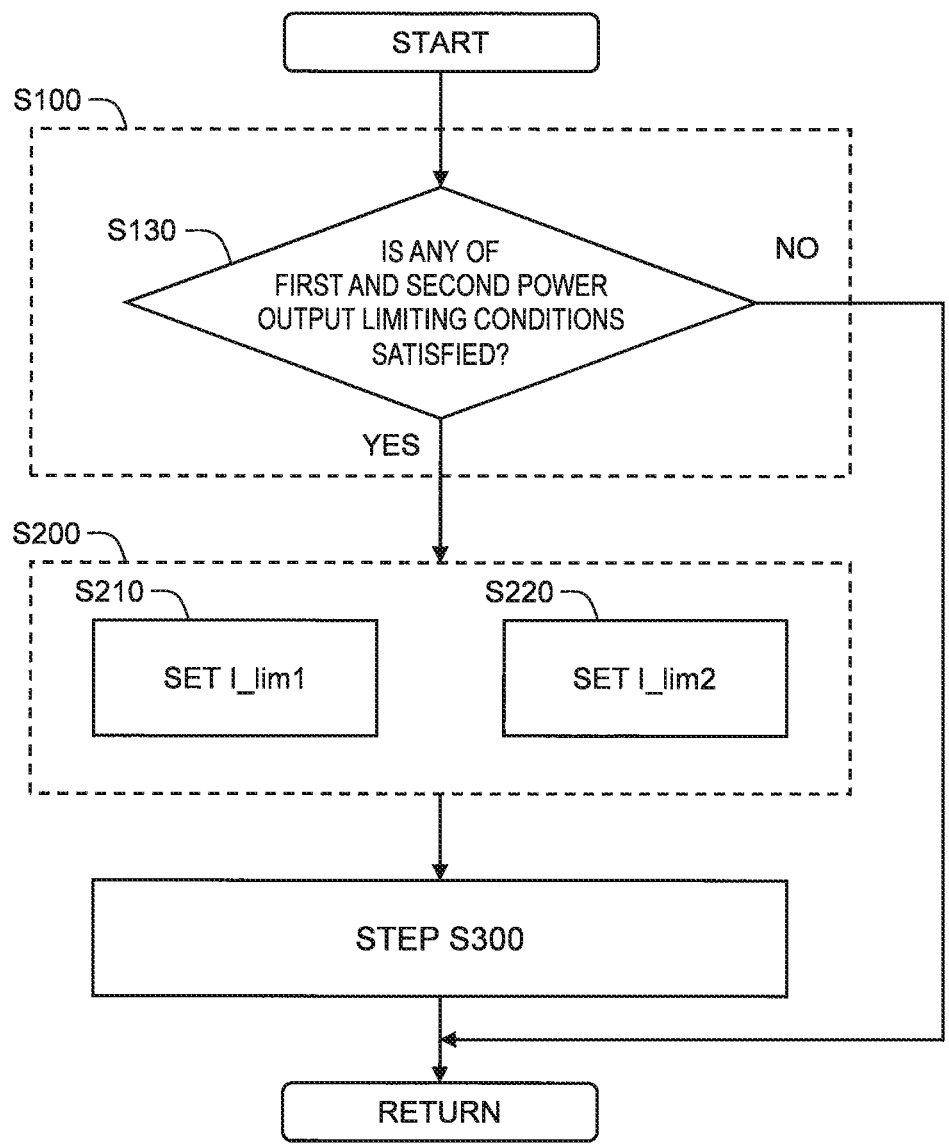
FIG. 10 is a flow chart showing a third example of the processing by the steer-by-wire system according to the embodiment of the present disclosure.

FIG. 10 is a flow chart showing a third example of the processing by the steer-by-wire system 1. The third example is an example of a combination of the first example and the second example described above. Descriptions overlapping with the first and second examples described above will be omitted as appropriate.

Step S100 includes Step S130. In Step S130, the control device 100 determines whether or not at least one of the first power output limiting condition and the second power output limiting condition is satisfied. When neither the first power output limiting condition nor the second power output limiting condition is satisfied (Step S130; No), the processing in the current cycle ends. On the other hand, when at least one of the first power output limiting condition and the second power output limiting condition is satisfied (Step S130; Yes), the processing proceeds to Steps S200 and S300.

When the first power output limiting condition is satisfied, the control device 100 sets the first current limit value I_lim1 to execute the first power output limiting processing (Step S210). When the second power output limiting condition is satisfied, the control device 100 sets the second current limit value I_lim2 to execute the second power output limiting processing (Step S220).

Figure 11:
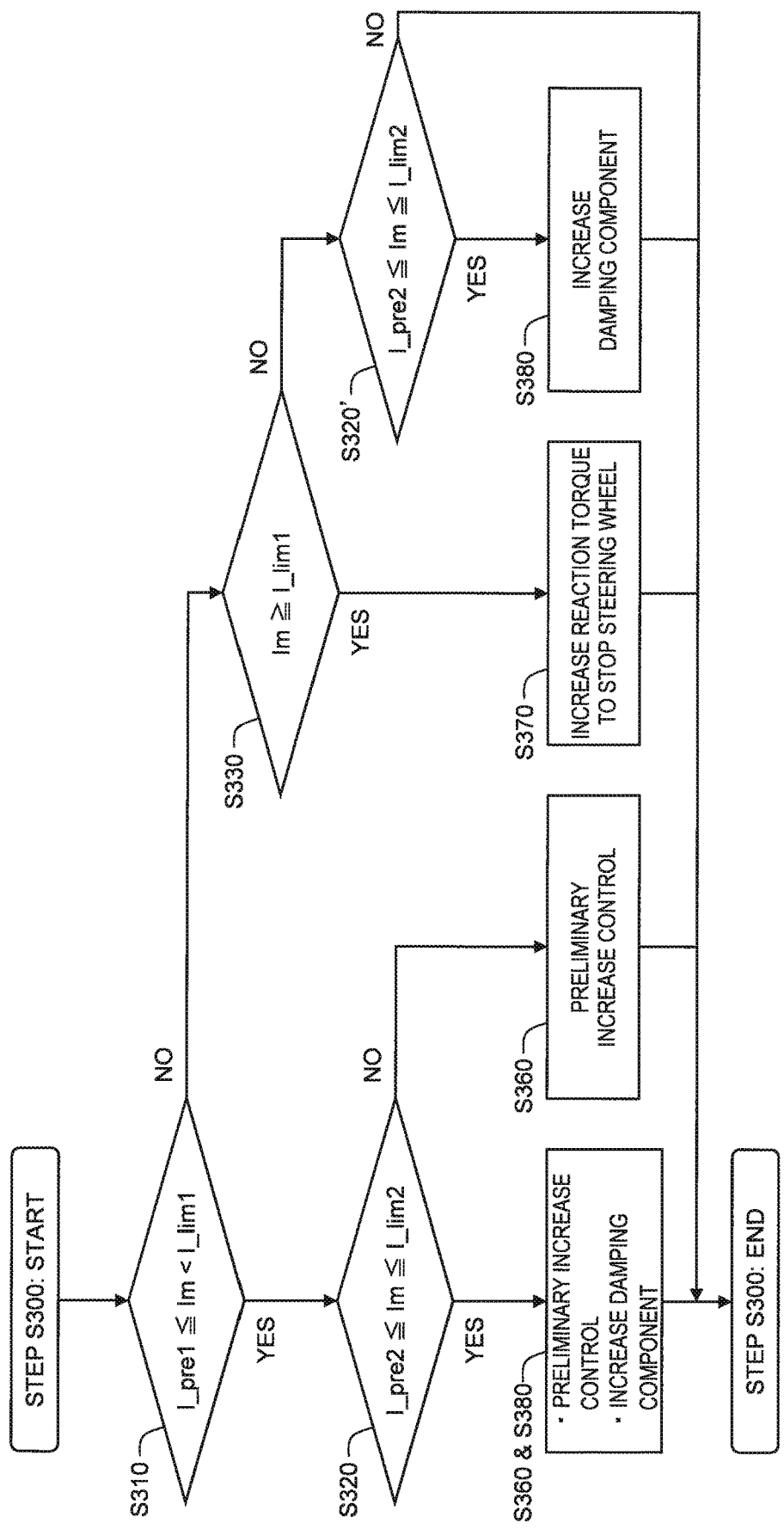
FIG. 11 is a flow chart showing Step S300 in the third example of the processing by the steer-by-wire system according to the embodiment of the present disclosure.

FIG. 11 is a flow chart showing Step S300 in FIG. 10.

When the motor current Im is equal to or higher than the first precursor start value I_pre1 and lower than the first current limit value I_lim1 (Step S310; Yes), the processing proceeds to Step S320. Otherwise (Step S310; No), the processing proceeds to Step S330.

When the motor current Im is equal to or higher than the second precursor start value I_pre2 and equal to or lower than the second current limit value I_lim2 (Step S320; Yes), the processing proceeds to Steps S360 and S380. Otherwise (Step S320; No), the processing proceeds to Step S360.

When the motor current Im is equal to or higher than the first current limit I_lim1 (Step S330; Yes), the processing proceeds to Step S370. Otherwise (Step S330; No), the processing proceeds to Step S320'.

When the motor current Im is equal to or higher than the second precursor start value I_pre2 and equal to or lower than the second current limit value I_lim2 (Step S320'; Yes), the processing proceeds to Step S380.

4-4. Fourth Example

Figure 12:
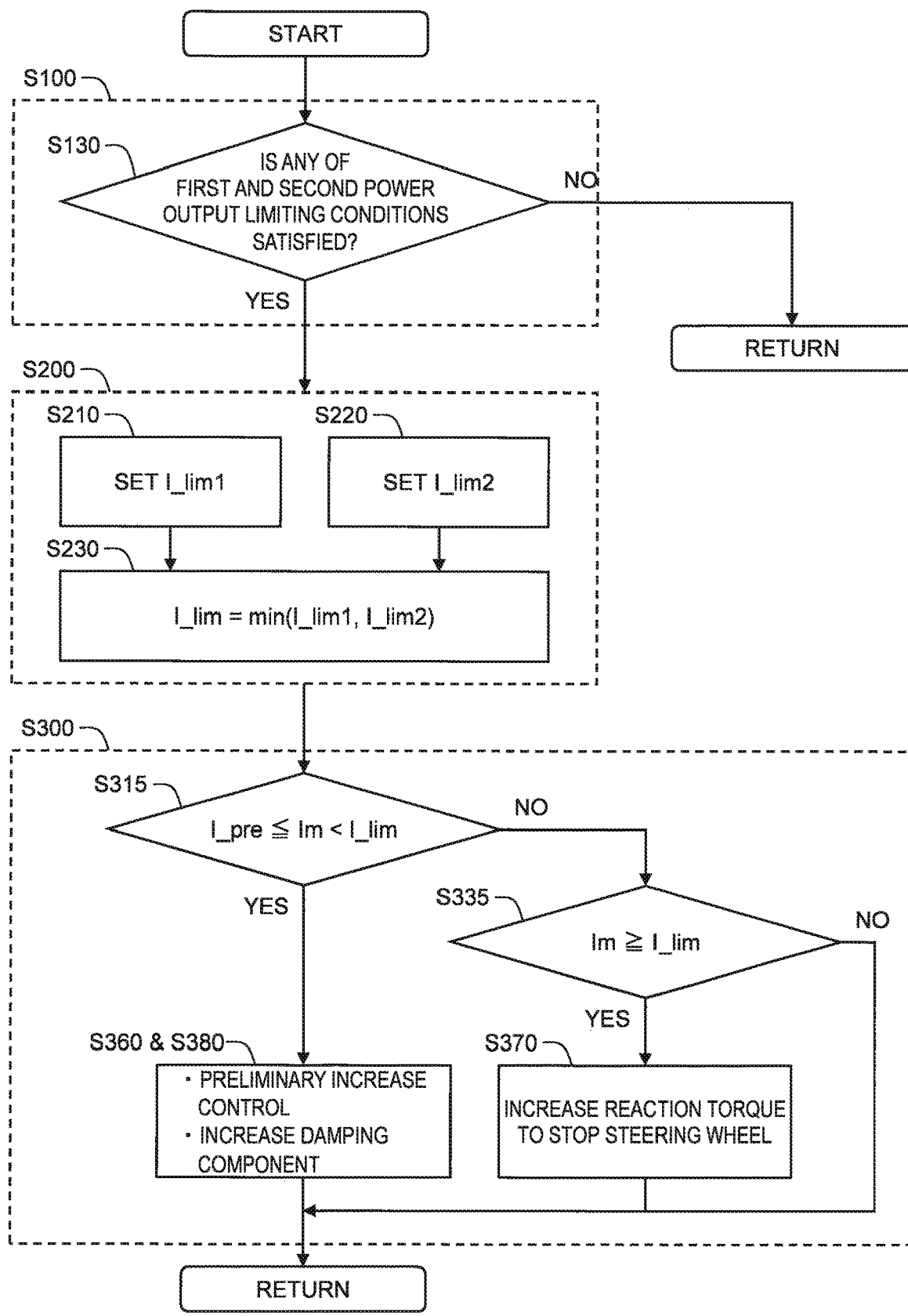
FIG. 12 is a flow chart showing a fourth example of the processing by the steer-by-wire system according to the embodiment of the present disclosure.

FIG. 12 is a flow chart showing a fourth example of the processing by the steer-by-wire system 1. The fourth example is another example of a combination of the first example and the second example described above. Descriptions overlapping with the first and second examples described above will be omitted as appropriate.

Step S100 includes Step S130. Step S130 is the same as that in the case of the third example described above.

When the first power output limiting condition is satisfied, the control device 100 sets the first current limit value I_lim1 to execute the first power output limiting processing (Step S210). On the other hand, when the first power output limiting condition is not satisfied, the control device 100 temporarily sets the first current limit value I_lim1 to a maximum value.

When the second power output limiting condition is satisfied, the control device 100 sets the second current limit value I_lim2 to execute the second power output limiting processing (Step S220). On the other hand, when the second power output limiting condition is not satisfied, the control device 100 temporarily sets the second current limit value I_lim2 to a maximum value.

In Step S230, the control device 100 selects the smaller one of the first current limit value I_lim1 and the second current limit value I_lim2 as the current limit value I_lim.

Step S300 is as follows. A precursor start value I_pre is a current value lower than the current limit value I_lim by a first value α (i.e. I_pre=I_lim−α). When the motor current Im is equal to or higher than the precursor start value I_pre and lower than the current limit value I_lim (Step S315; Yes), the processing proceeds to Steps S360 and S380. Otherwise (Step S315; No), the processing proceeds to Step S335. When the motor current Im is equal to or higher than the current limit value I_lim (Step S335; Yes), the processing proceeds to Step S370.

What is claimed is:

1. A control device for a vehicle of a steer-by-wire type, the vehicle comprising:
    a turning device configured to turn a wheel by actuating a turning motor; and
    a reaction torque generation device configured to apply a reaction torque to a steering wheel by actuating a reaction motor,
the control device being configured to control turning of the wheel by controlling the turning motor and to control the reaction torque by controlling the reaction motor, according to rotation of the steering wheel, wherein
when a power output limiting condition is satisfied, the control device executes not only power output limiting processing that limits a power output of the turning motor but also reaction torque increasing processing,
in the power output limiting processing, the control device stops the turning of the wheel, or decreases the power output of the turning motor as a steering speed of the steering wheel becomes higher, and in the reaction torque increasing processing, the control device controls the reaction torque to make the steering wheel harder to rotate as compared with a case where the power output limiting processing is not executed.

2. The control device according to claim 1, wherein
in the power output limiting processing, the control device limits the power output of the turning motor by decreasing a current limit value being an upper limit of a motor current driving the turning motor.

3. A control device for a vehicle of a steer-by-wire type, the vehicle comprising:
a turning device configured to turn a wheel by actuating a turning motor; and
a reaction torque generation device configured to apply a reaction torque to a steering wheel by actuating a reaction motor,
the control device being configured to control turning of the wheel by controlling the turning motor and to control the reaction torque by controlling the reaction motor, according to rotation of the steering wheel, wherein
when a power output limiting condition is satisfied, the control device executes not only power output limiting processing but also reaction torque increasing processing,
in the power output limiting processing, the control device limits a power output of the turning motor by decreasing a current limit value being an upper limit of a motor current driving the turning motor,
in the reaction torque increasing processing, the control device controls the reaction torque to make the steering wheel harder to rotate as compared with a case where the power output limiting processing is not executed,
in the power output limiting processing, the control device decreases the current limit value such that the turning of the wheel stops, and
in the reaction torque increasing processing, the control device makes the reaction torque in a case where the motor current is equal to or higher than the current limit value higher than the reaction torque in a case where the motor current is lower than the current limit value.

4. The control device according to claim 3, wherein
a precursor start value is a current value lower than the current limit value by a first value, and
in the reaction torque increasing processing, the control device makes the reaction torque in a case where the motor current is equal to or higher than the precursor start value higher than the reaction torque in a case where the motor current is lower than the precursor start value.

5. The control device according to claim 4, wherein
in the reaction torque increasing processing, the control device gradually increases the reaction torque as the motor current increases from the precursor start value to the current limit value.

6. The control device according to claim 3, wherein
the power output limiting condition includes that a temperature of the turning motor exceeds a temperature threshold or a voltage supplied to the turning motor falls below a voltage threshold.

7. A control device for a vehicle of a steer-by-wire type, the vehicle comprising:
a turning device configured to turn a wheel by actuating a turning motor; and
a reaction torque generation device configured to apply a reaction torque to a steering wheel by actuating a reaction motor,
the control device being configured to control turning of the wheel by controlling the turning motor and to control the reaction torque by controlling the reaction motor, according to rotation of the steering wheel, wherein
when a power output limiting condition is satisfied, the control device executes not only power output limiting processing but also reaction torque increasing processing,
in the power output limiting processing, the control device limits a power output of the turning motor by decreasing a current limit value being an upper limit of a motor current driving the turning motor,
in the reaction torque increasing processing, the control device controls the reaction torque to make the steering wheel harder to rotate as compared with a case where the power output limiting processing is not executed,
in the power output limiting processing, the control device decreases the current limit value as a steering speed of the steering wheel becomes higher,
a damping component of the reaction torque increases as the steering speed of the steering wheel becomes higher, and
in the reaction torque increasing processing, the control device increases the damping component as compared with a case where the reaction torque increasing processing is not executed.

8. The control device according to claim 7, wherein
a precursor start value is a current value lower than the current limit value by a second value, and
in the reaction torque increasing processing, the control device makes the damping component in a case where the motor current is equal to or higher than the precursor start value higher than the damping component in a case where the motor current is lower than the precursor start value.

9. The control device according to claim 7, wherein
the power output limiting condition includes that electric power of the turning motor exceeds a power threshold.

* * * * *